Figure 1:
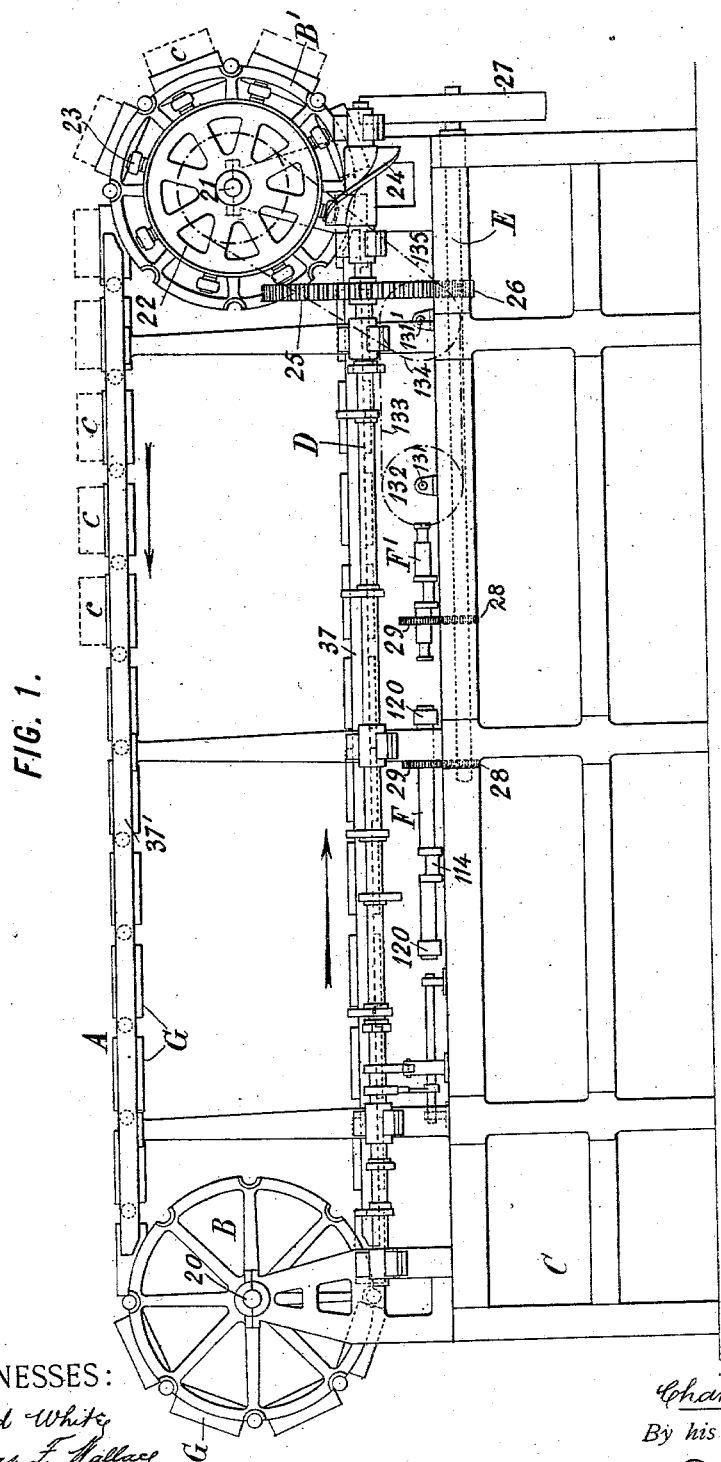

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 1.

WITNESSES:
Fred White
Thomas F. Wallace

INVENTOR:
Charles W. Lovell,
By his Attorneys,
Arthur E. Fraser & Co

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 2.

WITNESSES:
Fred White
Thomas F. Wallace

INVENTOR:
Charles W. Lovell,
By his Attorneys.
Arthur C. Fraser & Co.

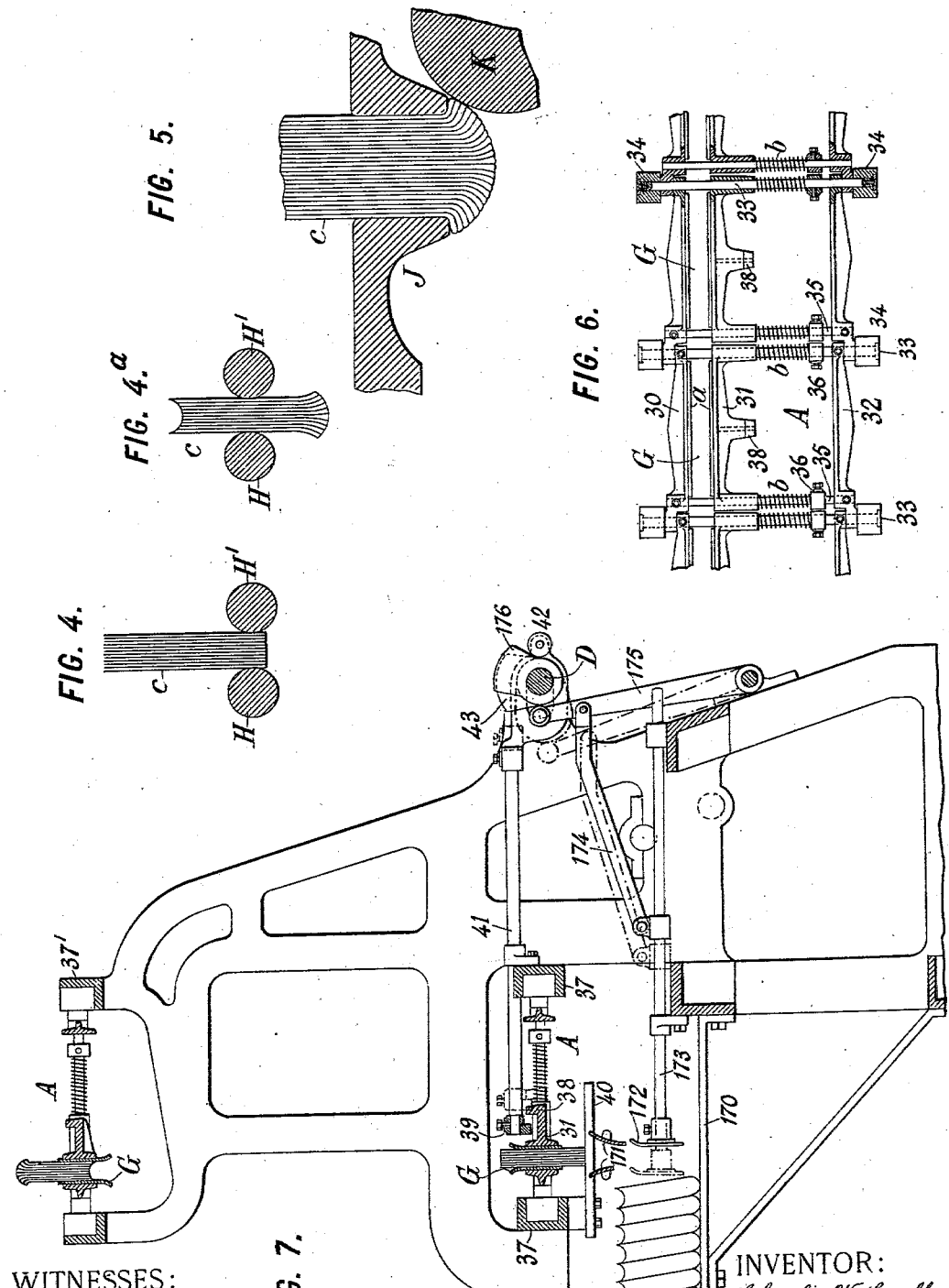

No. 753,413.  
PATENTED MAR. 1, 1904.

C. W. LOVELL.  
MACHINE FOR ROUNDING, BACKING, AND LINING BOOKS.  
APPLICATION FILED MAY 24, 1897.

NO MODEL.  
11 SHEETS—SHEET 4.

FIG. 8.

WITNESSES:  
Fred White  
Thomas F. Wallace

INVENTOR:  
Charles W. Lovell,  
By his Attorneys.

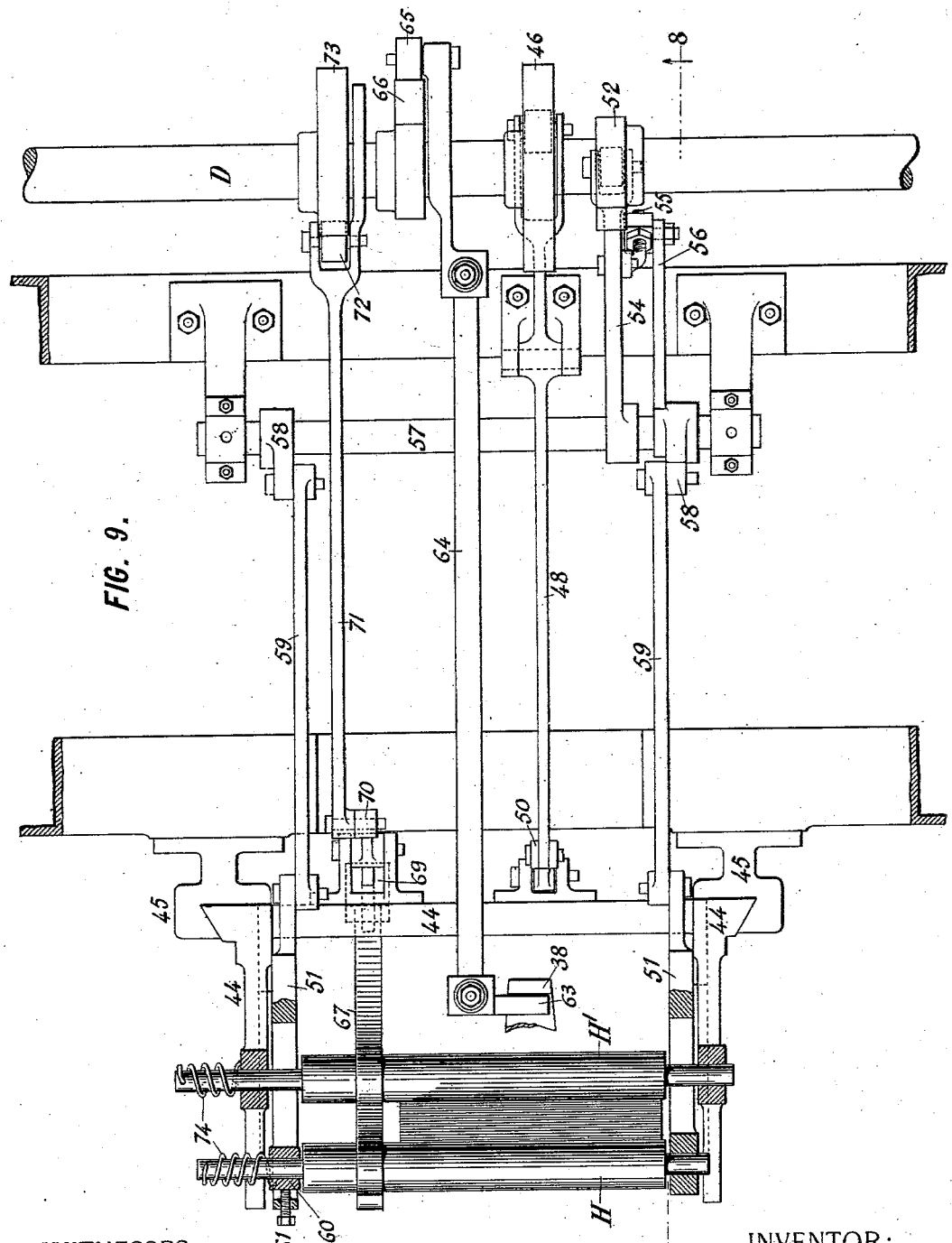

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 6.

WITNESSES:
Fred White
Thomas F. Wallace

INVENTOR:
Charles W. Lovell,
By his Attorneys,
Arthur E. Fraser & Co.

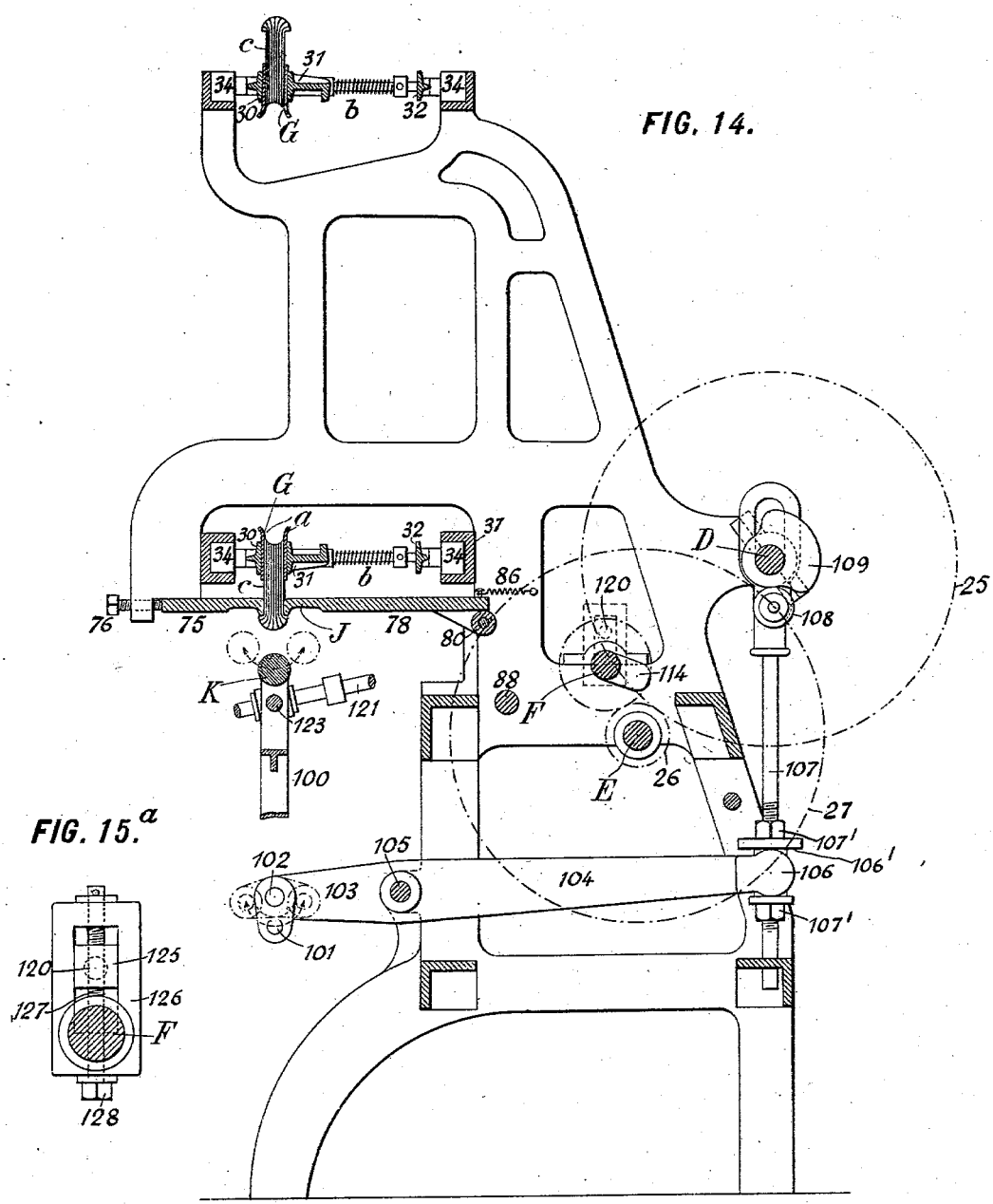

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 8.

INVENTOR:
Charles W. Lovell,
By his Attorneys.

WITNESSES
Fred White
Thomas F. Wallace

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 9.

WITNESSES:
Fred White,
Thomas F. Wallace

INVENTOR:
Charles W. Lovell,
By his Attorneys,
Arthur C. Fraser & Co.

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 10.

WITNESSES:
Fred White
Thomas F. Wallace

INVENTOR:
Charles W. Lovell,
By his Attorneys,

No. 753,413. PATENTED MAR. 1, 1904.
C. W. LOVELL.
MACHINE FOR ROUNDING, BACKING, AND LINING BOOKS.
APPLICATION FILED MAY 24, 1897.
NO MODEL. 11 SHEETS—SHEET 11.

WITNESSES:
Fred White
Thomas F. Wallace

INVENTOR:
Charles W. Lovell,
By his Attorneys,
Arthur C. Fraser & Co

No. 753,413. Patented March 1, 1904.

UNITED STATES PATENT OFFICE.

CHARLES W. LOVELL, OF BROOKLYN, NEW YORK, ASSIGNOR TO ARTHUR C. FRASER AND GEORGE H. FRASER, OF BROOKLYN, NEW YORK.

MACHINE FOR ROUNDING, BACKING, AND LINING BOOKS.

SPECIFICATION forming part of Letters Patent No. 753,413, dated March 1, 1904.

Application filed May 24, 1897. Serial No. 637,892. (No model.)

*To all whom it may concern:*

Be it known that I, CHARLES W. LOVELL, a citizen of the United States, residing in Brooklyn, in the county of Kings and State of New York, have invented certain new and useful Improvements in Machines for Rounding, Backing, and Lining Books, of which the following is a specification.

This invention provides a machine for use by bookbinders in performing certain operations incident to the binding of round-backed books. The machine is adapted for performing the operations of, first, "rounding" the back of the book; second, "backing" or rolling down and expanding the back of the book, and, third, "lining" or applying fabric to the book-back, the latter including the applying of "crash" or open-work woven fabric glued to the book-back and projecting beyond the same at both sides to form flaps for the attachment of the book case or cover and the applying over this of a layer of lining-paper coincident in size with the back of the book.

Machines have before been constructed for rounding and backing books by operations immediately succeeding one another and known as the "Crawley" machine, which is disclosed in Patents No. 184,198, of November 7, 1876, and No. 372,128, of October 25, 1887. In this Crawley machine the stitched book is fed by the operator between rounding-rollers, which then close together, squeezing the book firmly between them, and then by executing a partial revolution carrying the book out between them and at the same time forcing it into convex shape at its back and concaving the opposite edges of the leaves. A backing-clamp then seizes the protruding back portion and grips the book powerfully just forward of its back, so that the rounded back expands, whereupon the rounding-rollers open and free the book. The backing-clamp then swings forward, carrying the book to the backing mechanism, which comprises a roller or die which moves rapidly from side to side against the back of the book, rolling or rubbing it down, opening the folds of the signatures, and expanding the back at the sides sufficiently to receive the cover-boards. The backing-clamp then swings back and pauses, while the operator grasps the rounded and backed book, whereupon the clamp opens and the operator removes the book from the clamp. The clamp then swings back again close to the rounding-rolls, which meanwhile have rounded another book, which in turn is seized by the backing-clamp, and so the operation proceeds.

My invention provides a machine in which the books to be operated upon are fed to clamps which engage them and carry them to the rounding and backing mechanisms and thence, if desired, onward to be subjected to other operations, preferably that of lining. Each clamp is capable of grasping and holding one book, and the clamps are connected to a carrier or feed mechanism, so that they are advanced intermittently and preferably together. The preferable construction is to couple the clamps together as an endless chain, which is carried over sprocket-wheels and carried forward a distance at each movement from one clamp to the next. In one position of the clamps the stitched and trimmed book is fed into the clamp, which then closes and grasps it. In the next position the clamp partly opens and the rounding-rollers engage the sides of the book and round it, after which the clamp closes again to again grasp the book. In the next position the rounded book is gripped by a backing-clamp, which holds its back portion while the backing roller or die acts against its back. In the position beyond this the same or another backing-roller repeats this backing operation, the book being held in the same or a different backing-clamp. Preferably the backing operation is performed at least three times in three different positions of the clamp. Thereafter during the advancing movement of the clamp it carries the book over a glueing roller or brush, which applies glue to the back of the book. In a subsequent stopping position a sheet of crash or open textile fabric is raised and pressed against the book-back, the book being first grasped by a stationary clamp to hold it firm. Then or preferably at a subsequent position of the clamp the lining-paper is pressed against the book-back exterior to the crash or fabric. The book may continue to be carried by the clamp for a sufficient time to dry the back or until any convenient point is reached for discharging the book, at which point the clamp is opened and the book drops out.

In the accompanying drawings I have shown a machine adapted to carry out these operations and embodying the preferred form of my invention.

Figure 2:
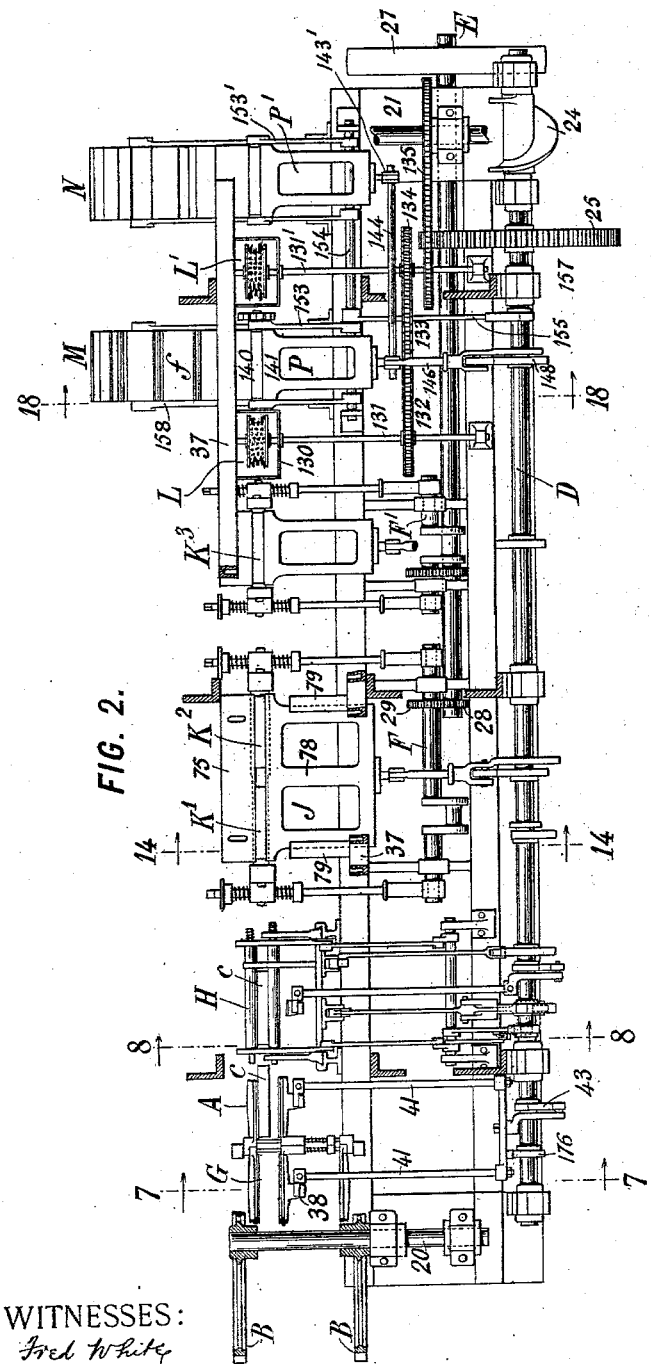
Figure 3:
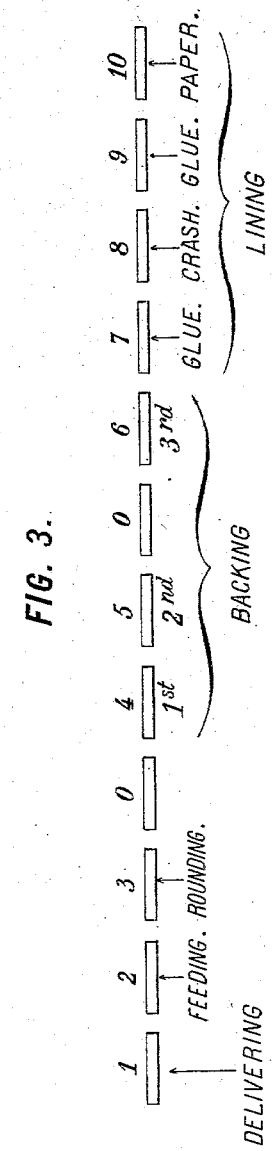
Figure 15:
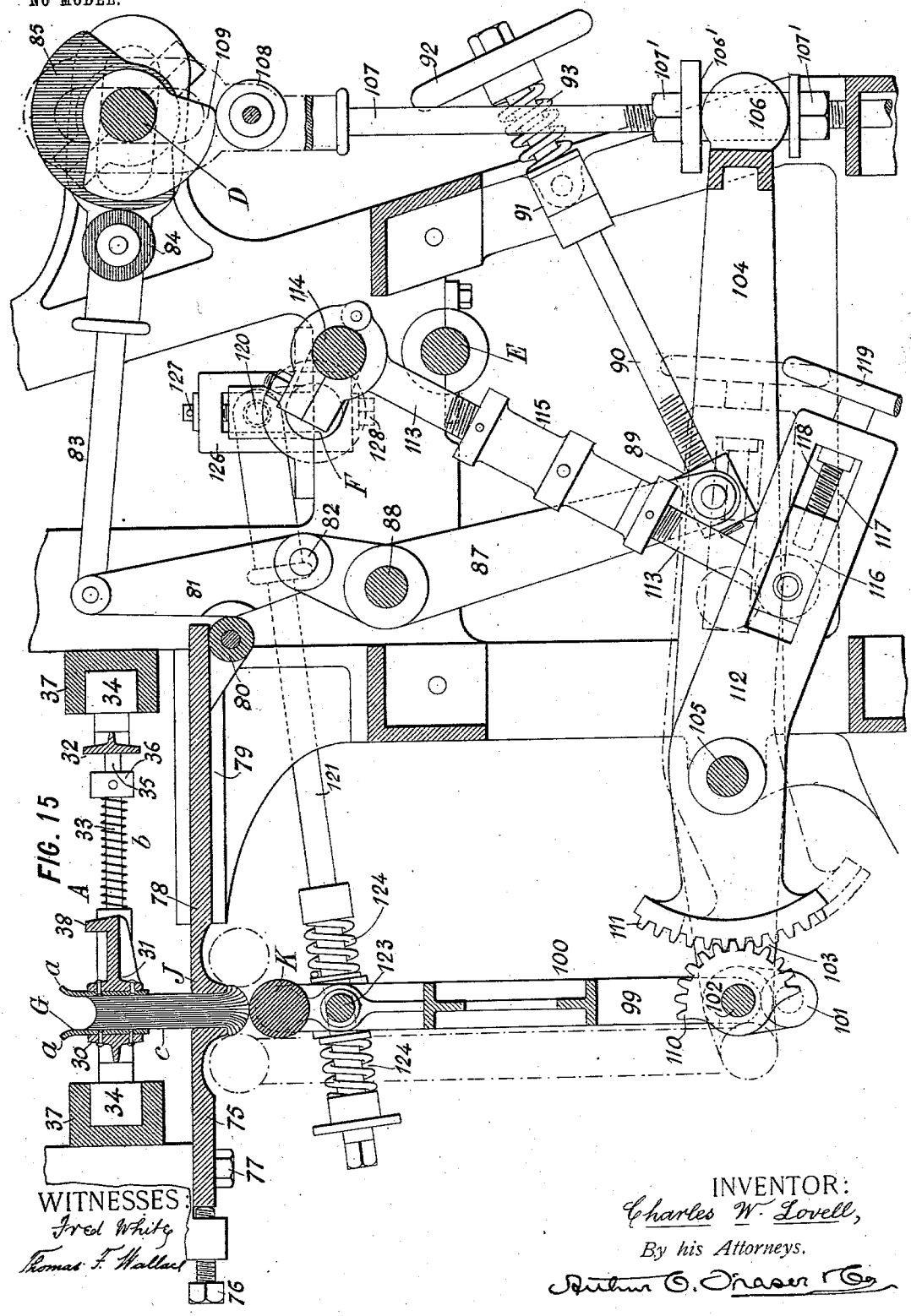
Figure 16:
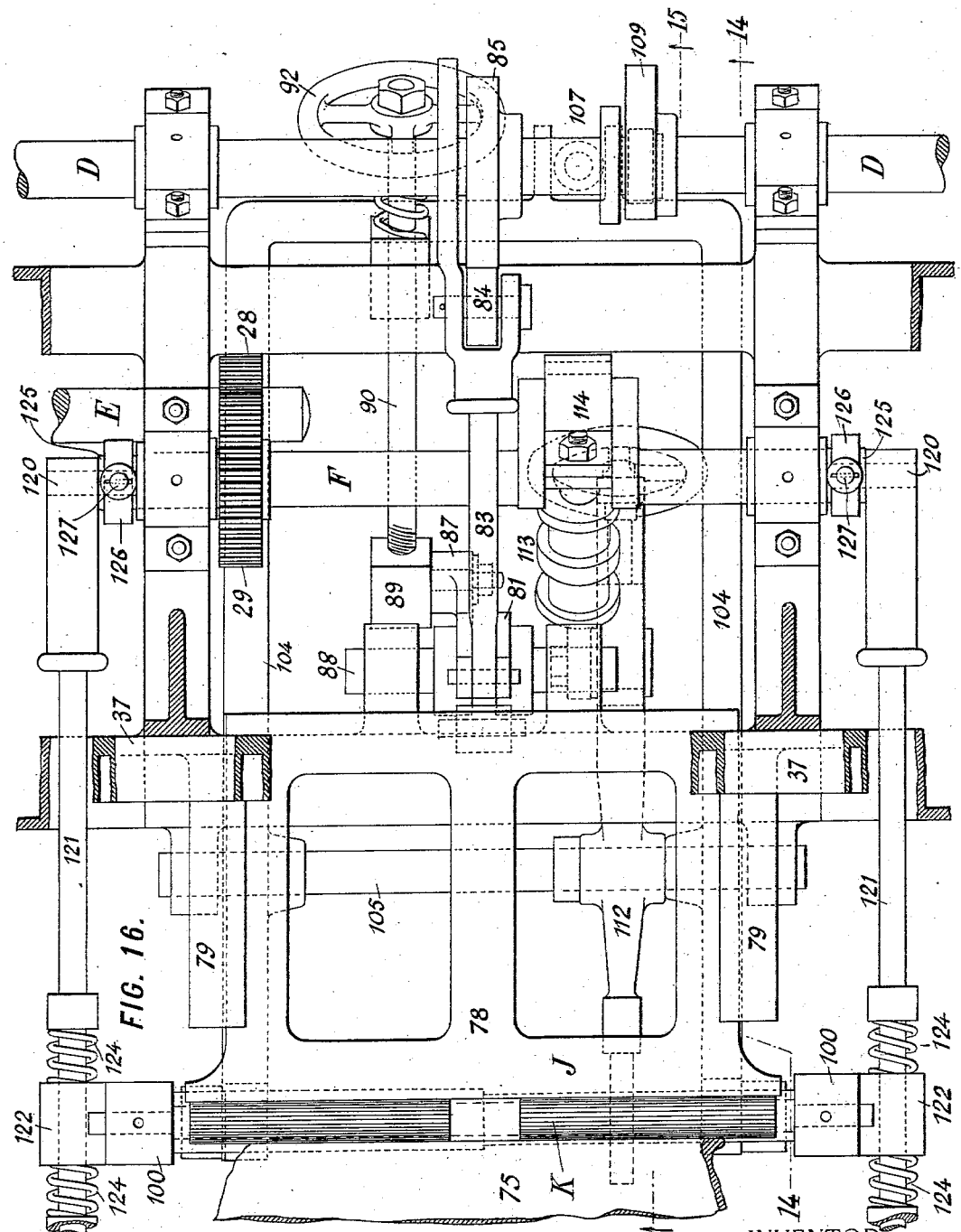
Figure 17:
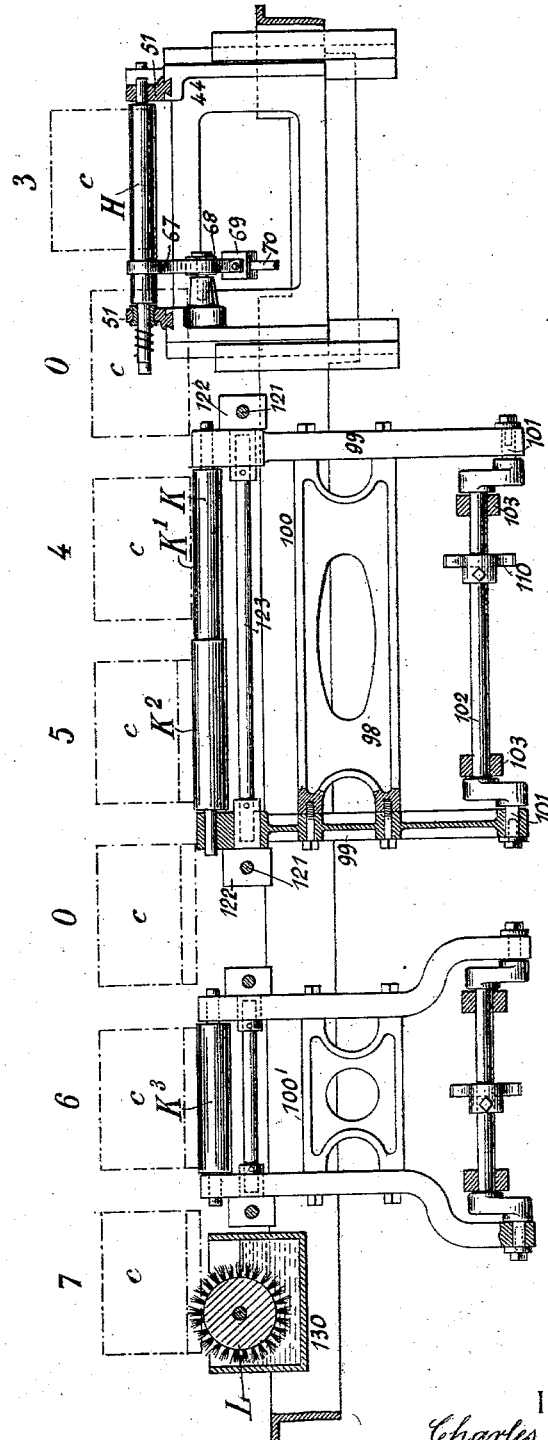
Figure 18:
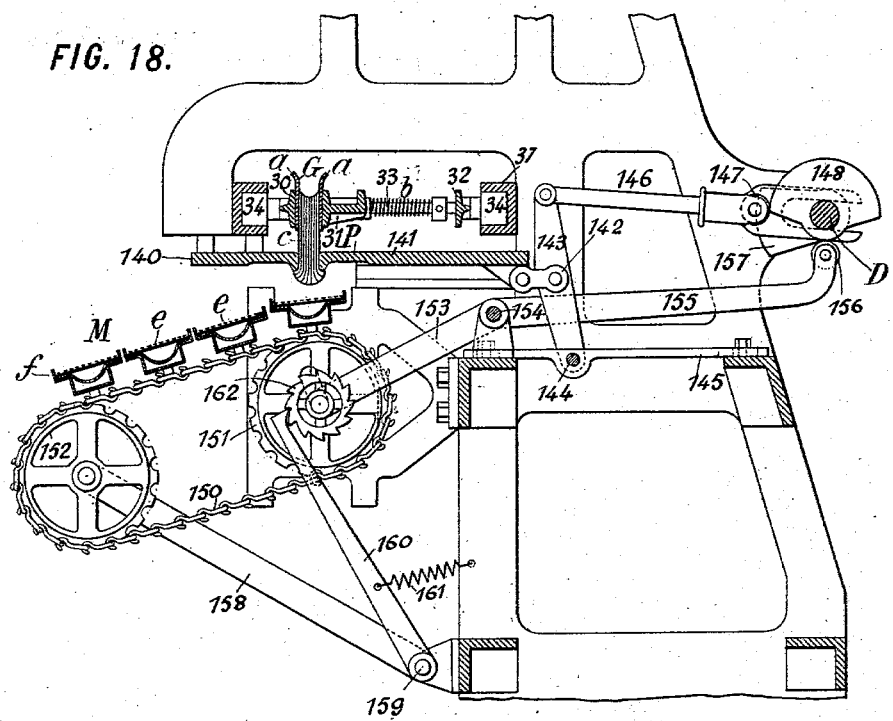
Figure 19:
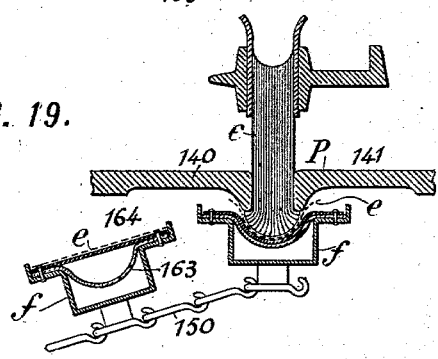
Figure 20:
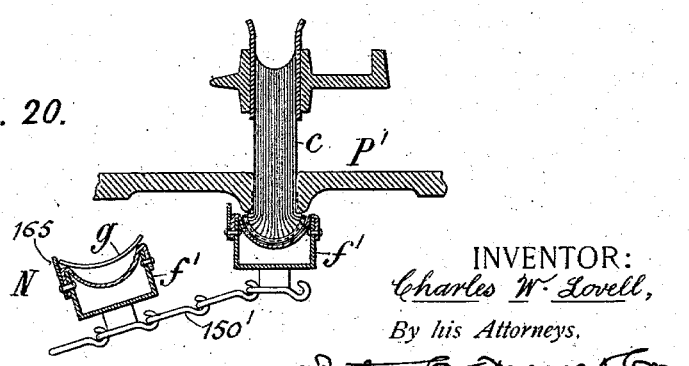

Figure 1 of the drawings is a rear elevation of the machine, showing the frame, the chain and its supports, and the shafts and gearing, most of the other working parts being omitted for clearness. Fig. 2 is a plan of the machine, partly broken away and in horizontal section, the carrying-chain being chiefly omitted to show the other parts beneath and many of the details being omitted. Fig. 3 is a diagrammatic plan showing the positions in which the successive operations are performed. Figs. 4 and 4ª are transverse sections showing the operation of rounding, and Fig. 5 is a fragmentary section showing the operation of backing. Fig. 6 is a plan of a portion of the chain, partly in section. Fig. 7 is a vertical transverse section cut approximately in the plane of the line 7 7 in Fig. 2. Fig. 8 is a vertical transverse section through the rounding mechanism cut in the plane of the lines 8 8 in Figs. 2 and 9. Fig. 9 is a fragmentary plan, partly in horizontal section, showing the rounding mechanism. Figs. 10, 11, 12, and 13 are sectional elevations of the rounding mechanism, showing the successive operations thereof. Fig. 14 is a vertical transverse section of the machine, taken approximately in the plane of the lines 14 14 in Figs. 2 and 16 and showing the backing mechanism before beginning the backing operation. Fig. 15 is a similar section, on a larger scale, showing the backing mechanism in detail and in operation, the section being cut in the plane of the line 15 15 in Fig. 16. Fig. 15ª shows separately the adjustable crank 126 of Fig. 15. Fig. 16 is a fragmentary plan, partly in horizontal section and showing the backing mechanism. Fig. 17 is a front elevation of part of the rounding and backing mechanism, viewed in the opposite direction from Fig. 1 and being partially in section. Fig. 18 is a fragmentary vertical transverse section in a plane approximately on the line 18 18 in Fig. 2 and showing the lining mechanism. Figs. 19 and 20 are fragmentary transverse sections on a larger scale than Fig. 18 and showing the lining mechanisms in operation, Fig. 19 showing the mechanism for applying crash and Fig. 20 that for applying lining-paper.

I will proceed to describe the particular construction of machine embodying my invention, which is shown in the accompanying drawings, remarking that this is the preferred construction, but that my invention is susceptible of being greatly varied, as will hereinafter appear.

An endless chain A, preferably constructed as shown in Fig. 6, is carried at opposite ends over sprocket-wheels B B', fixed on horizontal shafts 20 and 21, respectively, which shafts are mounted in suitable bearings in a frame C of any suitable construction. Any suitable means is provided for propelling the chain step by step, the means shown consisting of a wheel 22, Fig. 1, fixed on the shaft 21, having radial arms carrying rollers 23, which are successively engaged by a snail or spiral cam 24, which is fixed on the main shaft D. This main shaft extends nearly the entire length of the machine and carries the several cams which impart motion to the operative parts or instrumentalities. It is driven through a gear 25 and pinion 26, Figs. 1 and 14, from a driving-shaft E, carrying a belt-pulley 27. The shaft E drives two crank-shafts F and F', Fig. 1, through the medium of gears 28 on the driving-shaft and 29 on the driven shafts.

The books to be operated upon are carried in a series of book-clamps G G. In the construction shown these are formed as part of the chain A. Referring to Figs. 6 and 7 or 15 the clamps G G consist, essentially, of opposite clamping-plates $a$ $a$, which are pressed together by springs $b$ $b$. The plates $a$ $a$ are fixed to or formed integrally with link-bars 30 and 31, respectively, Fig. 6, while the chain proper is constructed as a ladder-chain of link-bars 30 and 32, connected by pivotal rods or cross-pins 33, on the ends of which are carried rollers 34. Between the links 30 and 32 are connected auxiliary rods 35. The link-bar 31, which carries the movable jaw or plate $a$ of the clamp, slides on the rods 33 and 35 and receives the pressure of the springs $b$ $b$, which are coiled around these rods and which react against adjustable set-collars 36 36. For guiding the chain and holding its links firmly in exact alinement the rollers 34 34 are caused to travel in guides 37 37, which may be constructed as channels, as shown, for the lower part of the chain in Fig. 7, or as angle-iron, as shown at 37', for the upper or returning part of the chain. There is no novelty in this construction of chain nor is my invention limited to this exact construction.

Fig. 3 shows in plan the several stopping positions of the books being operated upon as they are carried through the machine by the chain. The books are lettered $c$ $c$ in all the figures. In position No. 1 the book previously acted upon and now finished is delivered out of the clamp. In position No. 2 a new book is fed into the clamp. In position No. 3 the book is rounded. In position No. 4 the book is backed. In No. 5 the backing operation is repeated. In No. 6 it is again repeated. In No. 7 glue is applied to the book-back, and in No. 8 the first lining is performed—namely, the applying of crash. In position No. 9 glue is again applied to the book-back over the crash, and in position No. 10 the final operation is performed—namely, the applying of lining-paper to the book-back exterior to the crash.

I will proceed to describe the successive operations and the mechanism by which they are performed in detail, commencing with the feeding of the book to be operated upon. It will be understood that one operation is performed to each turn of the main shaft D and that the chain is first moved forward during perhaps one hundred and twenty degrees of the rotation of said shaft and during the remainder of such rotation the other operations are performed.

*Feeding.*—Immediately after the chain comes to rest the clamp G, which is in position No. 2, is opened, and the operator places a book to be operated upon, already sewed and trimmed, between the jaws of the clamp back downward, its position being gaged by a table 40, Fig. 7, on which its back rests, and its end being moved against one end of the clamp. Immediately thereafter the clamp closes again and grips the book with a strength dependent upon the tension of its springs b, after which the chain again moves forward. The movable jaw 31 of the clamp has an upturned toe 38, and to open the clamp this toe is engaged by a finger 39 on a sliding rod 41, the rear end of which carries a roller 42, which is acted on by a cam 43 on the main shaft D, as shown in Fig. 7. There is no novelty in this mechanism.

Figure 11:
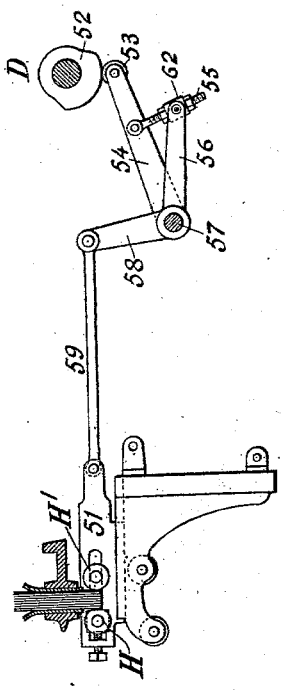
Figure 13:
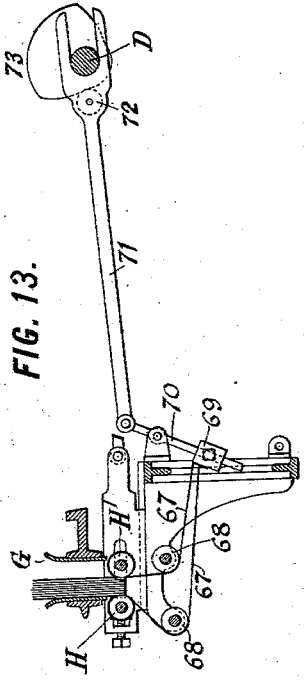
Figure 10:
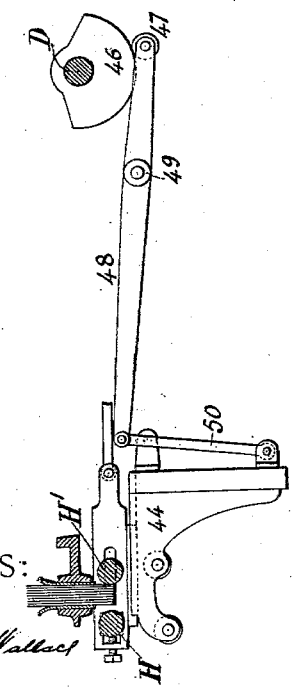
Figure 12:
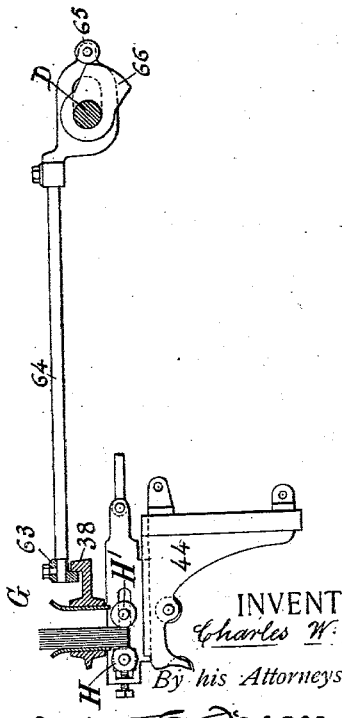

*Rounding.*—As the chain comes to rest, bringing the book into position 3, Fig. 3, the book stands over rounding-rollers H H', which with their supports stand so far beneath it as not to interfere with the forward movement of the books while carried by the chain. The rounding-rollers then rise until they occupy positions on opposite sides of the back portion of the book, as shown in Fig. 10, whereupon they close together against the back of the book, as shown in Figs. 11 and 4. The clamp G then opens, as shown to an exaggerated extent in Fig. 12, but more accurately in Fig. 8, leaving the book gripped between the rollers. The rollers then execute a rotating movement, carrying the book downward between them to approximately the position shown in Fig. 4ª, and thereby rounding up or convexing its back and concaving its front. The clamp G then again closes upon the book. The rounding-rollers then separate, freeing the book, and the rollers then again descend to their original position, where they stand out of the way of the next forward movement of the books. The chain then again moves forward. I will now describe the mechanisms for performing these operations. The rollers H H' are carried on a frame 44, which is mounted to slide vertically in guides 45, Figs. 8 and 9, and is moved up and down by means of a cam 46 on the main shaft D through the medium of a roller 47, against which this cam acts, on a lever 48, fulcrumed at 49, and the other end of which connects by a link 50 with the slide 44, this mechanism being shown isolated in Fig. 10. The roller H' has bearings directly in the brackets forming part of the sliding frame 44, while the roller H, which is movable relatively to the roller H', has bearings in horizontal slides 51, sliding in ways on top of the slide 44, as seen in Fig. 17, and driven by a cam 52 on the main shaft D through the medium of a roller 53, lever-arm 54, adjustable link 55, elbow-lever 56, having pivotal shaft 57, and two upright arms 58, which connect by two links 59 with the respective slides 51. For adjusting the relative parallelism of the two rollers one end of roller H is mounted in a sliding block 60, Fig. 9, adjustable by a screw 61. The extent to which the rollers are moved together is determined by adjusting the effective length of the link 55 by means of the set-nuts thereon, which engage opposite sides of the block 62, which is pivoted to the lever 56. All this mechanism is shown isolated in Fig. 11. For opening the clamp G to release the book the same mechanism is provided as for opening the clamp in the book-feeding position—that is to say, the toe 38 on the movable jaw is engaged by a finger 63, projecting downward from a rod 64, which slides in bearings and carries at its rear end a roller 65, acted on by a cam 66, this mechanism being isolated in Fig. 12. For turning the rounding-rollers I have shown the mechanism which is isolated in Fig. 13 and which consists of straps, belts, or chains 67 67, wound partly around the respective rollers, with their ends fastened thereto, thence carried downward and over idler-pulleys 68, and thence backwardly to an adjustable block 69, fixed on a lever 70, which is connected by a link 71 to a roller 72, which rolls on a cam 73 on the main shaft D. For turning the rollers H H' backward they are provided with spiral springs 74, Fig. 9, wound about their prolonged axes.

I would remark that the rounding mechanism just described is an adaptation of that shown in the Crawley patents, before mentioned, and differs therefrom essentially in only two respects—namely, in that the rollers are mounted to move toward and from the book to be grasped between them and in that the rollers are arranged in a horizontal plane so as to receive a book standing vertically—whereas in the Crawley machine the rollers are placed in a vertical plane to receive a book fed between them horizontally and are not mounted to move toward or from the book.

*Backing.*—In my machine the backing is performed three times (more or less) in three successive positions of the book. In each of these operations immediately after the chain comes to rest the back portion of the book protruding below the book-carrying clamp G is engaged between the jaws of a backing-clamp J, Figs. 5 and 14, which squeezes the sides of the book together close to the back, thereby causing the rounded back to swell outwardly, and immediately thereafter a backing-roller K, which incessantly moves back and forth through the arc of a circle, as indicated in Fig. 14, rises and bears with considerable pressure against the back of the book and rolling repeatedly thereover breaks open and expands the folds of the signatures in the manner best shown in Fig. 5, after which this roller descends to approximately the position shown in Fig. 14. The clamp J then opens, releasing the book, and the chain then carries the book forward to the next position.

For backing the book I prefer the use of a backing-roller, as just described and as shown in patent of Crawley, No. 184,198, although, if preferred, a concave backing-die may be used, as shown in patent of Crawley, No. 372,128, these two means being now well known as equivalents for one another.

I will now proceed to describe the specific construction of the backing mechanism, remarking, however, that my invention is not limited to this exact construction, but that any mechanism for firmly holding the book and for moving a backing roller or die across its back may be substituted in carrying out my invention.

The backing-clamp J is constructed with a stationary but adjustable jaw 75, adjusted by screws 76, Fig. 15, fastened by screws 77, passing through slots in the jaw, and with a movable jaw 78, which slides in ways 79 79, formed on the fixed frame. For moving the movable jaw it has a roller 80 at its rear side, against which bears a lever 81, fulcrumed at 82 and connected by a link 83 to a roller 84, which is acted on by the clamping-cam 85, Fig. 15, on the shaft D. The clamp is opened by springs, one of which is shown at 86, Fig. 14. For adjusting the position of the movable jaw or the extent to which it shall approach the stationary jaw lever-fulcrum 82 is made adjustable by being formed on a short arm of a lever 87, fulcrumed on a shaft 88, the long arm of which is pivoted to a block 89, which is internally threaded, and into which screws the threaded end of an adjusting-screw 90, which is held in a block 91, swiveled to the frame, and has fixed on its end a wheel 92, by which to turn it, a stiff spring 93 being interposed to enable the fulcrum to yield, and thereby impart a slightly yielding action to the clamping-jaw 78. Other mechanism, however, may be readily devised for operating the backing-clamp J.

The backing-roller K is hung at its ends in a frame 100, consisting of end pieces 99 and a cross-piece 98, Fig. 17. The lower end of this frame is hung on cranks 101, formed on the ends of an oscillating shaft 102. This shaft has bearings in the front ends of levers 103, constituting a rocking frame 104, Fig. 14, which is pivoted on a horizontal shaft 105. The rear end of this frame may be rounded as shown at 106 and engaged between collars or flanges 106' on a rod 107, which extends upward and carries a roller 108, which is acted upon by a lifting-cam 109, Fig. 14, on the shaft D. Hence once in a revolution of this shaft the rear end of the frame 104 is thrown down, thereby elevating its front end and lifting the frame 100 and pressing roller K into contact with the back of the book. To press the roller up to different heights to accommodate different projections of the rounded book-backs, the collars 106' may be adjusted on the rod 107 by means of nuts 107'.

To impart to the roller K its rolling motion in an arc-shaped path around the back of the book, the frame 100 is swung by an approximately parallel motion through this same path by means of two mechanisms, which I will now describe. Its lower end being mounted on the cranks 101 on the shaft 102 is moved by the oscillation of this shaft, which is oscillated through the medium of a pinion 110 fixed on it, with which meshes a toothed sector 111, formed on a lever 112, which is pivoted on the shaft 105, and which lever is connected by a pitman 113 with a crank 114 on the shaft F. The pitman 113 is made adjustable in length by being constructed of right and left threaded rods screwing into a sleeve 115. The pitman is pivoted to a block 116, which is adjustable in a horizontal slot 117 in the lever 112, being adjusted therein by a screw 118, turned by a wheel 119. The purpose of this adjustment is with a fixed throw of the crank 114 to vary the angle of movement of the lever 112, and consequently the extent of the arc through which the shaft 102 is oscillated, and hence also the extent of the arc-shaped movement imparted to the lower end of the frame 100, and thus the extent of vertical movement imparted to the backing-roller K. On the ends of the shaft F are formed cranks 120 120, which are connected by pitmen 121 with the upper end of the frame 100. These pitmen have a yielding connection with the frame, preferably by passing freely through blocks 122, which are swiveled to the frame by being fixed on a transverse shaft 123, and on each side of these blocks are springs 124 124, coiled around the respective rods and reacting on collars formed thereon. The lead of the cranks 120 relative to the crank 114 is such that the sidewise movement imparted by the former cranks to the upper end of the frame 100 is coincident with the sidewise movement imparted by the crank 114 through the medium of the lever 112, the toothed sectors, and the crank-shaft 102 to the lower end of the frame 100. For enabling the side throw thus imparted to the upper part of the frame 100 to be adjusted I make the throw of the cranks 120 adjustable by means of any suitable mechanical construction—as, for example, by that shown in Fig. 15ª, where the crank-stud 120 is formed on a block 125, sliding in the opening of a crank-arm 126, forged on the end of the shaft F, with an adjusting-screw 127 passing longitudinally through said crank-arm, engaging internal threads in said block, and having a head 128, by which to turn it, whereby the block may be propelled in either direction. By thus adjusting the throw of the crank 120 and correspondingly adjusting the position of the block 116 in the lever 112 the movement imparted to the backing-roller K may be modified to adapt it to any shape of book to be backed.

It will be understood that the roller K is driven constantly from the shaft F, so that it incessantly traverses the arc-shaped path described, that during the feeding movement of the chain it is out of action by being lowered, as shown in Fig. 14, and that to bring it into action it is raised by the cam 109, as shown in Fig. 15.

The specific backing mechanism thus described is not essential to my invention, as the mechanism may be greatly varied. All that is essential is that a backing-roller (or die) shall be moved from side to side against the back of the book with the necessary pressure and that when out of action it shall move away from the book sufficiently to not interfere with the forward feeding of the books by the chain. In this respect the essential difference between my backing mechanism and that of the said Crawley patents is that the book on being gripped by the backing-clamp is held stationary and the backing-roller moves toward the book-back and after completing its operation thereon recedes therefrom, whereas in the Crawley machine the book is gripped by a backing-clamp and is carried thereby to the backing-roller, which has an arc-shaped movement around a stationary axis, and after its operation the book is caused to recede from it by a return movement of the backing-clamp.

By my invention I am enabled to utilize the advantages of a progressive forward feed of successive books by means of clamps carried by an endless chain or other equivalent carrier.

An important feature of my invention is the provision for executing repeated backing operations upon the same book. Thus in one position the book-back may be rolled with a light pressure for the purpose principally of bending out the signatures. In a second position it may be rolled with a heavier pressure, and in a third position it may be rolled with still heavier pressure and brought to the required shape. I have shown in the drawings a machine adapted for rolling the book-back in three successive operations; but I am not limited to this particular number. Referring to Fig. 17, the roller K and frame 100 are made of sufficient length to cover two successive positions of the book, (numbers 4 and 5,) so that the same roller performs a first and a second backing operation. I have shown the portion $K^2$ of the roller, which executes the second backing operation, as being of slightly larger diameter than the portion $K'$, which executes the first backing operation, in order thereby to roll the back down harder or under heavier pressure at the second operation than at the first. Of course, if preferred, these may be separate rollers and mounted in separate frames; but as this would involve a duplication of the driving mechanism I prefer for the sake of simplicity to combine them both in one frame. For performing the third backing operation I have shown a distinct roller $K^3$, mounted in a distinct frame 100', which differs from that already described only in being narrower by reason of supporting a shorter roller. As all the mechanism for driving and supporting this frame is an exact duplicate of that already described for the frame 100, it requires no separate description. The roller $K^3$ operates on the book in position number 6, between which and position number 5 the books occupy an idle position O, this being necessary in order to gain room for the mechanisms. It is advantageous to give the roller $K^3$ a separate mounting from the roller K in order that as it executes the finishing or final backing operation it may be adjusted to its work independently of the adjustment of the roller which performs the first and second operations.

*Lining.*—In my improved machine the operation of "lining" or "lining up" the book comprises four successive steps—namely, first, applying glue to the book-back; second, applying crash thereto; third, again applying glue, and, fourth, applying lining-paper.

First. For applying glue to the book-back the most suitable and convenient means comprises a revolving roll or brush L, turning in a tank 130, Figs. 2 and 17, containing glue or other adhesive. The brush L is fixed on revolving shaft 131, which is driven by a sprocket-wheel 132 and chain 133 from a sprocket-wheel 134 on another shaft 131', which is driven by a chain 135 from the shaft 21 for the main chain A. Thus the glue roller or brush revolves only while the books are advancing. This is desirable, because when located in the position shown underneath one of the stopping positions of the books it would if revolved continuously apply more glue to the part of the book-back which stops in contact with it than elsewhere.

Second. The crash is applied by the mechanism best shown in Fig. 18 and the position of which is indicated in Fig. 2 at M, this letter designating generally the feed mechanism for feeding in and applying the crash. The pieces of crash to be fed are made of a length somewhat shorter than the length of the book and of a width sufficiently greater than the width of the book-back to leave flaps of from one to two inches in width (according to the size of the book) projecting. After the book has been fed forward by the chain and has come to rest in the crash-applying position its back portion is first gripped by a stationary clamp P. A piece of crash has meanwhile been fed into position directly beneath the book-back and is then elevated and pressed firmly into contact with the glued surface of the book-back by a presser which conforms to the rounded book-back and which dwells for a moment to hold the crash in place and then descends, leaving the crash attached to the book. The clamp P then opens, releasing the book, and the latter is again fed forward.

The clamp P is in all essential respects of exactly the same construction as the backing-clamp J. This comprises a stationary jaw or plate 140, which may be adjustable or not, and a movable jaw or plate 141, mounted to slide in any suitable way, and connected by a link 142 to a lever 143, which is fixed on a rock-shaft 144, having bearings in adjustable cross-pieces 145, and at its free end is connected by a link 146 to a roller 147, acted on by a cam 148 on the main shaft D. By this means the clamp is opened and closed at proper intervals.

The sheets of crash are shown in Figs. 18 and 19 by dotted lines at $e\ e$. For feeding and applying the crash the mechanism M comprises a series of trays or carriers $f\ f$, which are carried upon an endless chain 150, which should be constructed as a ladder-chain or a double chain, and is carried around sprocket-wheels 151 and 152. The wheel 151 has its shaft journaled at opposite ends in two arms 153, projecting from a rock-shaft 154, to which is fixed an arm 155, which projects backward and carries on its end a roller 156, which is acted on by a cam 157 on the shaft D. The sprocket-wheel 152 has its shaft journaled at opposite ends in lever arms or links 158, pivoted at 159. A pawl 160 is drawn by a spring 161 against a ratchet-wheel 162, which is fixed on the shaft of the sprocket-wheel 151. As the cam 157 depresses the lever 155 it raises the sprocket-wheel 151 and presses the tray or carrier $f$ which is at the top of this sprocket-wheel upwardly, so that the crash $e$, which it carries, is pressed up against the book-back, as shown in Fig. 19, and in so doing one tooth of the ratchet-wheel 162 is carried past the nose of the pawl 160, and on the ensuing downward movement this tooth of the ratchet-wheel catches against the end of the pawl, and the wheel is turned a distance from one tray $f$ to the next, thereby swinging the empty tray inward and feeding the next tray carrying a piece of crash into position on top of the sprocket-wheel ready to be applied to the next book. I have shown only four trays $f$; but these trays are of course continued all the way around the chain. This particular mechanism has of itself no special novelty and may be substituted by any other mechanism adapted to feed and apply the pieces of crash. The trays $f$ are shown as consisting each of a section of bent metal carrying a flexible backing-piece 163—of leather, for example—and an elastic crash-supporting piece 164 (see Fig. 19) of, for example, india-rubber, while the upturned edges of the metal tray serve as gages for holding the edges of the crash in position. The crash is supported by the india-rubber sheet 164 in flat condition until the ascent of the tray carries it into contact with the rounded book-back, whereupon the rubber stretches and lays the crash around the book-back, and it is pressed thereagainst by the reinforcing and non-stretching leather sheet 163.

Third. The second gluing of the book-back to apply glue upon the exterior of the crash is effected by means of a second glue roller or brush L′, identical with the brush L and mounted on the shaft 131′, which is connected thereto by chain-gearing, so as to be driven coincidently therewith, as already explained.

Fourth. The paper lining is applied in the position N in Fig. 2, this letter designating the mechanism for feeding and applying the paper. The back portion of the book is first grasped by a clamp P′, which is a counterpart of the clamp P. A sheet of lining-paper having been fed into position beneath the book is then raised and pressed firmly against the glued back of the book and being held there a moment the presser descends, leaving it attached to the book-back, after which the clamp P′ opens and the book is again fed forward.

The lining-applying mechanism N is in the machine shown exactly identical in construction with the crash-applying mechanism M, and for this reason it is not specifically illustrated in detail. The clamp P′ is identical in construction with the clamp P and is operated from the same cam 148 by means of another arm 143′, projecting from the rock-shaft 144. The trays $f'$, Fig. 20, for feeding and applying lining-paper $g$ are generally similar in construction to the trays $f$ and are carried in like manner on a chain 150′, which is identical with the chain 150 and is carried by an exact duplicate of the mechanism thereof, so that, except for difference in the shape of the trays $f'$, Fig. 18 illustrates the lining-paper-applying mechanism as well as the crash-applying mechanism. The paper-applying mechanism is elevated by the same cam 157 acting through the same arm 155 and shaft 154, which shaft has arms 153′, Fig. 2, supporting the vertically-movable sprocket-wheel, which corresponds to the wheel 151, Fig. 18. As the lining-paper is cut to the exact length and width of the book-back, the trays $f'$ are of corresponding shape and have a gage 165 on one edge for insuring the correct position of the paper.

It should be understood that the lining mechanism may be greatly varied. My invention is not limited to the use of an endless chain carrying trays for both feeding and applying the linings, as other mechanisms for successively feeding and applying the linings may be substituted. The mechanisms shown are, however, preferred, as they are simple in construction, and one operator sitting between the mechanisms M N in Fig. 2 can easily feed both with the previously-cut crash and paper. In any case where the crash is sufficiently open and the glue applied at L is sufficiently liquid so that after the crash is applied sufficient glue oozes through to enable the lining-paper to be successfully glued to the book-back without the necessity for any second application of glue the glue-applying brush L' may be omitted. The mechanism for applying the lining-paper may be wholly omitted, or this paper may be subsequently applied by hand either before or after removing the book from the machine. For a paper-covered book the crash is omitted and the paper cover takes the place of the lining-paper. By "lining mechanism" I mean any mechanism adapted to apply a lining fabric, such as crash or super or paper or any suitable material, to the back of the book or two or more layers of fabric, if desired, either in one operation or in successive operations and either to the back alone or to the back and sides.

*Drying.*—The backs of the books are dried by retaining the books in the carrying-clamps G G during the return travel of the chain over the top, as shown in the upper part of Fig. 14 and as shown in Fig. 1, where a few books are shown in dotted lines at *c c*.

Any other desired operations in the completing of the book—such, for example, as the applying of the book covers or cases—may be performed while the books are carried by the clamps in this machine, thereby avoiding the expense and waste of repeated handlings of stacks of books in different stages of completion.

*Delivering.*—When the book has been carried to any suitable point in the travel of the chain, it is delivered out of the machine by opening the carrying-clamp and dropping it out. This is preferably done in the position No. 1, Fig. 3. In this position the book stands over a receiving-table 170, Fig. 7, and as the clamp G is opened the book, that stands back downwardly falls onto this table, being guided, if desired, by guides 171, after which a pusher 172 thrusts the book forward, displacing at the same time a stack of preceding books, and thus making room for the next book to be delivered. This mechanism is not new. The clamp G is opened by a duplicate of the parts 39 41, &c., already described, Fig. 7, these parts for the opening of the clamps in both the delivering and receiving positions being operated by the same cam 43 through the medium of a cross-head, as shown in Fig. 2. The pusher 172 is mounted on a slide 173, which is connected by a link 174 with a lever 175, carrying a roller which is acted on by a cam 176. Any other suitable means for opening the clamp and delivering out the book may be substituted for the mechanism shown.

It is thus seen that in my improved machine a succession of books are receiving in successive positions the action of the several tools required to round, back, and line or cover the books, the books being fed forward simultaneously and the several tools or active mechanisms operating in alternation with the feed. The book after being originally fed into the machine does not require handling until it is finally delivered, thus effecting a great economy of both labor and room and avoiding much confusion incidental to stacking up books in a bindery in different stages of completion. Only three operatives are required—one to feed in the books, a second to feed the lining crash and paper, and the third to take away the books that have been operated on.

It must not be inferred from the particularity with which I have described the details of the machine herewith illustrated that my invention is limited to these details of mechanism, since, in fact, my invention is susceptible of wide variation or modification in matters of detail and even in the general construction of the several mechanisms which are grouped together as part of my novel combination. Many important and even radical changes may be made in this mechanism without departing from the essential scope of my invention, which is believed to be carefully defined in the following claims.

I claim as my invention the several improvements in bookbinding machinery defined in the following claims, each substantially as hereinbefore set forth, namely:

1. A bookbinding-machine comprising the following successively-acting mechanisms, namely, rollers between which the book is engaged for rounding its back, means for compressing the rounded back, a gluing mechanism and means for applying a lining fabric to the glued book-back, combined with means for holding a book and presenting it to said mechanisms in succession.

2. A bookbinding-machine comprising the following successively-acting mechanisms, namely, means for compressing the book-back, a gluing mechanism, and means for applying a fabric to the glued book-back, combined with means for holding a book and presenting it to said mechanisms in succession.

3. A bookbinding-machine comprising a clamp for holding the book, means for moving it to successive operative positions, and the following mechanisms in these successive positions, namely, rollers between which the book is engaged for rounding its back, means for compressing the rounded back, means for gluing the back, and means for applying a lining fabric to the book-back.

4. A bookbinding-machine comprising a succession of clamps for holding the books, means for moving them to successive operative positions, and the following mechanisms in these successive positions, namely, rollers between which the book is engaged for rounding its back, means for compressing the rounded back, means for gluing the back, and means for applying lining fabric to the book-back.

5. A bookbinding-machine comprising an endless chain, clamps carried thereby for holding the books, means for advancing said chain intermittently, and the following mechanisms at successive stopping positions of the clamps, namely, rollers between which the book is engaged for rounding its back, means for compressing the rounded back, means for gluing the back, and means for applying a lining fabric to the book-back.

6. The combination with a rounding mechanism comprising a pair of rollers between which the book is engaged, and a backing mechanism comprising means for rolling down and compressing the rounded back, of a clamp adapted to grasp a book, present it to said mechanisms in succession, and subsequently discharge it.

7. The combination with a rounding mechanism comprising a pair of rollers between which the book is engaged, and a backing mechanism comprising means for rolling down and compressing the rounded back, of a clamp adapted to grasp a book and present it to said mechanisms in succession, and means for opening said clamp preparatory to the rounding operation and reclosing it thereafter.

8. The combination with a rounding mechanism comprising a pair of rollers between which the book is engaged, and a backing mechanism comprising means for rolling down and compressing the rounded back, of a progressively-advancing clamp adapted to grasp a book, present it to said rounding mechanism, release it during the rounding operation, thereafter regrasp it, and subsequently present it to the backing mechanism.

9. The combination with a rounding mechanism comprising a pair of rollers between which the book is engaged, and a backing mechanism comprising means for rolling down and compressing the rounded back, of a succession of clamps adapted to grasp successive books and carry them to said mechanisms, and means for opening each clamp preparatory to the rounding operation, and closing it after said operation to regrasp the book before the next advance movement.

10. The combination with a rounding mechanism comprising a pair of rollers between which the book is engaged, and a backing mechanism comprising means for rolling down and compressing the rounded back, of an endless chain carrying a series of book-clamps, means for advancing said chain intermittently to carry the clamps into positions to be operated upon by said mechanisms, and means for closing and opening the clamps to initially grasp the book, to release it and regrasp it in the rounding position, and to finally release it subsequent to the backing position.

11. The combination of a clamp for holding a book, a rounding mechanism comprising rounding-rollers between which the book is engaged for rounding its back, and means for opening and closing said clamp, adapted to open it preparatory to the rounding operation and to close it to again grasp the book at the end of said operation.

12. The combination of a book-clamp, means for moving it intermittently, a rounding mechanism comprising rounding-rollers at a stopping position of the clamp, and driving and clamp-opening mechanisms adapted in such position to close said rollers together against the book, then to open the clamp and release the book, then to turn the rollers to round the book, then to close the clamp to again grasp the book, then to separate said rollers to free the book, and finally to advance the clamp to carry the book beyond the rounding mechanism.

13. The combination of a book-clamp, means for moving it intermittently, a rounding mechanism comprising rounding-rollers at a stopping position of the clamp, and driving and clamp-opening mechanisms adapted in such position to first move the rollers from a position beyond the book-back into positions at the sides of the book, then to close them together against the book, then to open the clamp and release the book, then to turn the rollers to round the book, then to close the clamp to again grasp the book, then to separate said rollers to free the book, and to again move them beyond the book-back and out of the way of its travel, and finally to advance the clamp to carry the book beyond the rounding mechanism.

14. The combination with a book-clamp and means for moving it to and beyond a backing position, of a backing mechanism for compacting and spreading the book-back, adapted to act on the book while held by said clamp in said position.

15. The combination with a series of intermittently-advancing book-clamps, of a backing mechanism for compacting and spreading the book-back, adapted to act on the successive books while held by said clamps in one of the stopping positions thereof.

16. The combination with a series of intermittently-advancing book-clamps, moving through a determinate path, of a backing mechanism comprising means for compacting and spreading the book-back, adapted to act on each of the successive books while held by said clamps in one of the stopping positions thereof, and movable toward and from the book-back in said position.

17. The combination with a book-clamp and means for moving it to and beyond a backing position, of a stationary backing-clamp for grasping the book in said position, and a backing mechanism comprising means for compacting and spreading the book-back, moving toward the book-back, acting upon it while held in said clamp, and then receding from it.

18. The combination with an intermittently-advancing clamp for holding and carrying a book, of a backing mechanism at a stopping position of said book-clamp, comprising a backing-roller, a frame carrying said roller, a driving mechanism for reciprocating said frame to move said roller through an arc-shaped path, and mechanism for displacing said moving frame bodily toward the book-back to cause the roller to act thereupon and for retracting it to permit the clamp to advance the book.

19. The combination with an intermittently-advancing clamp for holding and carrying a book, of a stationary clamp and a backing mechanism at a stopping position of said clamp, said stationary clamp adapted to support the book-back during the backing operation, and said backing mechanism comprising a backing-roller, a frame carrying said roller, driving mechanism for reciprocating said frame to move said roller through an arc-shaped path, and mechanism for displacing said frame toward and from the book-back, and means for opening and closing said stationary clamp, said parts adapted to coöperate to essentially the effect set forth.

20. The combination with a progressively-moving book-clamp of backing mechanism comprising a roller for compacting and spreading the book-back, adapted to act on the book in successive positions of said clamp, whereby the book receives a plurality of backing operations.

21. The combination with a progressively-moving book-clamp of successive backing mechanisms, each comprising a roller for compacting and spreading the book-back, independently adjustable, and adapted to act upon the book in successive positions of said clamp.

22. The combination with a book-clamp of successively-acting mechanisms for compressing the book-back and for applying a lining of fabric thereto while the book is held in said clamp.

23. The combination with an endless chain, book-clamps carried thereby, means for advancing said chain intermittently, a backing mechanism comprising a roller for compressing the book-back, and a lining mechanism for affixing a fabric to the book-back, said backing and lining mechanisms adapted to act on the books in successive stopping positions of said clamps.

24. The combination with a book-clamp of successively-acting mechanisms for backing the book, comprising a roller for compressing the book-back, for applying glue to the rounded book-back, and for applying lining to the glued surface of the book-back.

25. The combination with an endless chain, book-clamps carried thereby, means for advancing said chain intermittently, and means for applying glue to the rounded book-back, for applying lining-crash to the glued surface of the book-back, for again applying glue to the book-back exterior to said crash, and for subsequently applying lining-paper thereto.

26. The combination with an endless chain, book-clamps carried thereby, means for advancing said chain intermittently, and lining mechanism comprising a stationary clamp for holding the back portion of the book, means for applying adhesive, and means for pressing the lining against the book-back.

27. The combination with an endless chain, book-clamps carried thereby, means for advancing said chain intermittently, and lining mechanism comprising means for applying glue to the book-back, a stationary clamp for holding the back portion of the book, means for pressing lining-crash against the book-back, and means for subsequently pressing lining-paper thereagainst.

In witness whereof I have hereunto signed my name in the presence of two subscribing witnesses.

CHARLES W. LOVELL.

Witnesses:
ARTHUR C. FRASER,
THOMAS F. WALLACE.